United States Patent [19]

Last et al.

[11] 4,452,301
[45] Jun. 5, 1984

[54] AIR CONDITIONING AND HEATING SYSTEM AIR TEMPERATURE CONTROL ARRANGEMENT

[75] Inventors: Daniel F. Last, Romeo; Robert H. Roth, East Detroit, both of Mich.

[73] Assignee: General Motors Corporation, Detroit, Mich.

[21] Appl. No.: 383,490

[22] Filed: Jun. 1, 1982

[51] Int. Cl.³ .......................... F28F 27/02; B60H 1/00
[52] U.S. Cl. ........................................ 165/42; 165/103
[58] Field of Search ....................... 165/42, 43, 24, 25, 165/103, 33

[56] References Cited

U.S. PATENT DOCUMENTS

| | | | |
|---|---|---|---|
| 2,617,632 | 11/1952 | Simpson . | |
| 2,828,110 | 3/1958 | Baker et al. . | |
| 2,971,450 | 2/1961 | Millman | 98/38 |
| 3,034,725 | 5/1962 | Person | 236/13 |
| 3,139,020 | 6/1964 | Schemenauer | 98/38 |
| 3,404,835 | 10/1968 | Rodgers | 236/13 |
| 3,650,318 | 3/1972 | Auery | 165/103 X |
| 3,735,809 | 5/1973 | Matsushima | 165/103 |
| 3,916,988 | 11/1975 | Matsuda | 165/42 |
| 3,934,642 | 1/1976 | Coulson et al. | 165/23 |
| 4,216,822 | 8/1980 | Izumi | 165/42 |
| 4,354,547 | 10/1982 | Sugiura | 165/103 X |
| 4,383,642 | 5/1983 | Sumikawa et al. | 165/42 X |

FOREIGN PATENT DOCUMENTS

| | | | |
|---|---|---|---|
| 2361696 | 6/1975 | Fed. Rep. of Germany | 165/25 |
| 2068593 | 8/1981 | United Kingdom | 165/42 |

Primary Examiner—Sheldon J. Richter
Attorney, Agent, or Firm—R. L. Phillips

[57] ABSTRACT

An air conditioning and heating system is disclosed having a manually operated air temperature door that is movable in both an air conditioning mode and a heating mode to regulate the amount of air passing through a heat exchanger to thereby control the temperature of the air delivered by the system. Adapted thereto is an air temperature control arrangement comprising an air baffle that is movable with and adjustable relative to the air temperature control door so as to adjust the amount of air passing through the heat exchanger in the various regulating air temperature door positions. A dual cam track operated air baffle control adjusts the air baffle relative to the air temperature door with movement of the latter and selectively according to one of two predetermined and different cam tracks having linearity patterns determined by the respective air conditioning mode and heating mode heat transfer requirements so as to provide substantial linearity between the temperature of the air delivered by the system and the air temperature control door position in both the air conditioning and heating modes.

3 Claims, 8 Drawing Figures

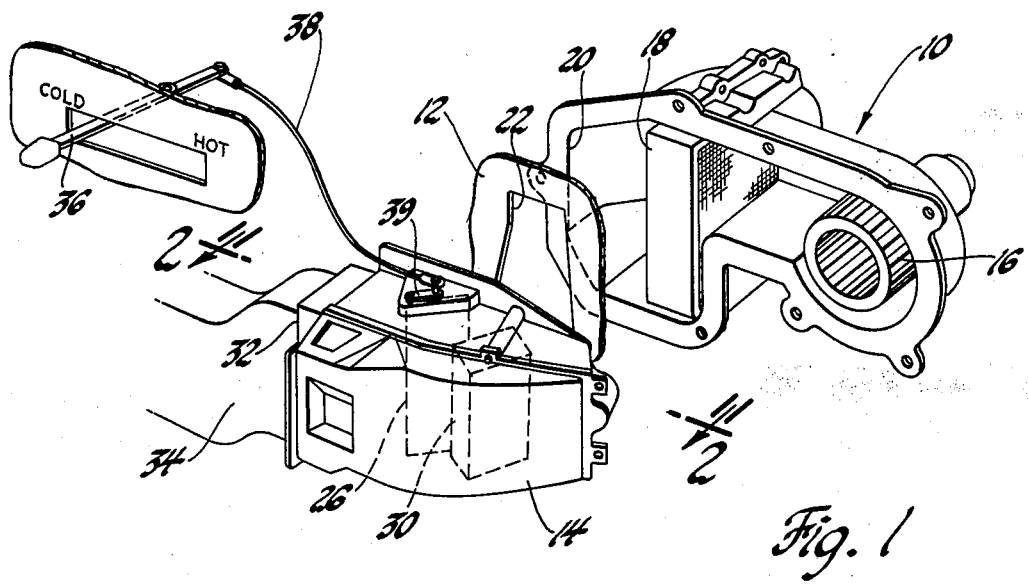
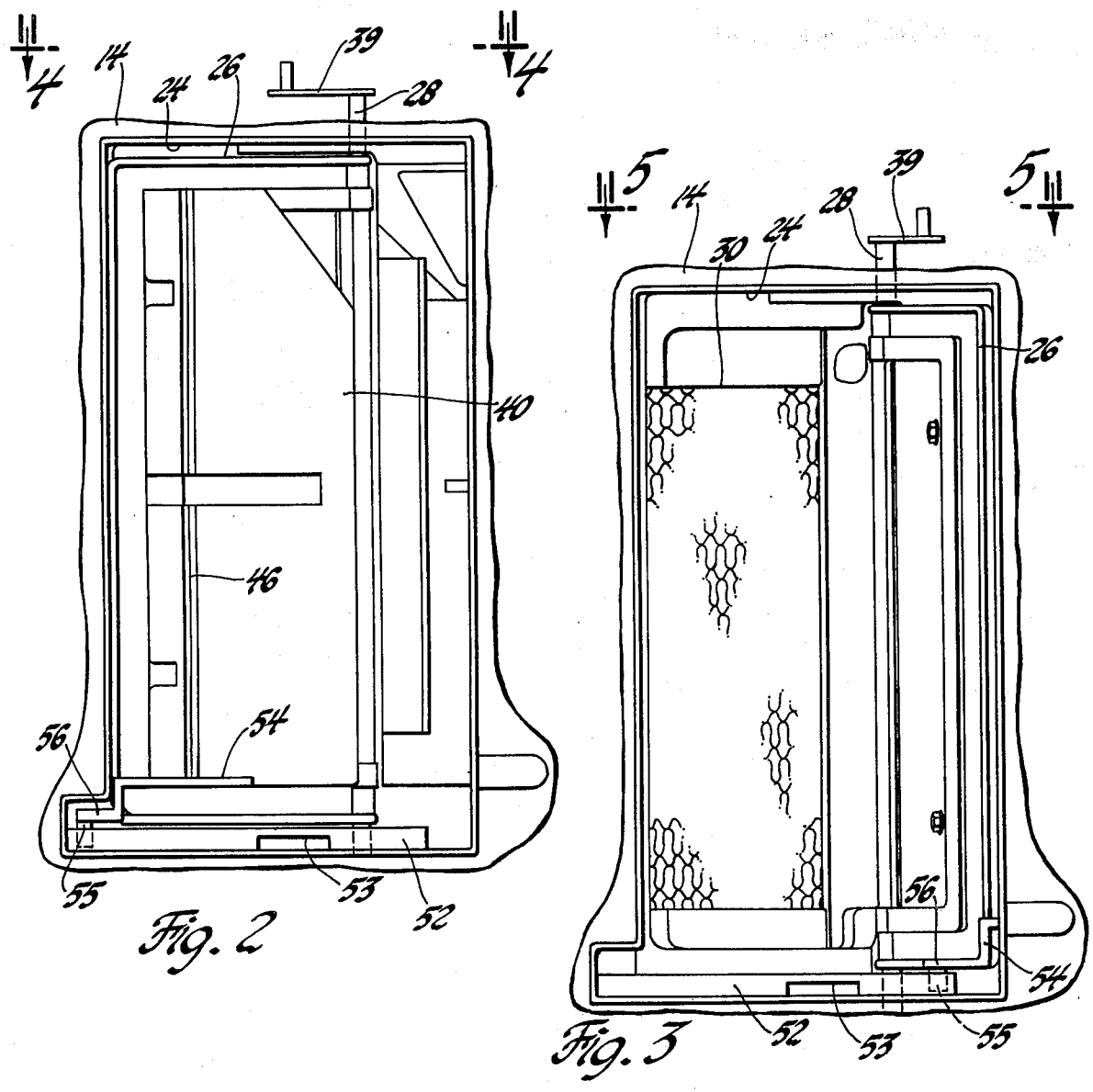

AIR CONDITIONING AND HEATING SYSTEM AIR TEMPERATURE CONTROL ARRANGEMENT

This invention relates to air conditioning and heating systems and more particularly to an improved air temperature control arrangement therefor.

In air conditioning and heating systems such as those used in vehicles it is conventional practice to employ a manually operated air temperature control valve in the form of a door that is movable in both an air conditioning mode and a heating mode to regulate the amount of air passing through a heat exchanger to thereby control the temperature of the air delivered by the system. In such an arrangement the amount of air required to pass through the heat exchanger at the same air temperature door position in both modes is normally different for the same temperature setting with the result that there is substantial non-linearity between the temperature of the air delivered by the system and the air temperature door position in the two modes. Typically, a single temperature legend labeled "COLD" and "HOT" at its extremes is arranged longitudinally of the travel of a temperature lever used by the operator to adjust the air temperature door and the operator thus must make substantially different incremental lever adjustments between these extremes depending upon the mode in order to obtain the desired temperature.

The present invention provides a simple solution to the above non-linearity problem with an improved air temperature control arrangement that retains the single manually operated temperature controller yet provides substantial linear control in each mode. This is accomplished with an air baffle that is movable with and adjustable relative to the air temperature door and a dual track operated cam that adjusts the air baffle relative to the air temperature door in a prescribed manner dependent on the desired mode. The baffle is effective to adjust the amount of air passing through the heat exchanger in the various regulating air temperature door positions and the dual track operated cam is effective to automatically adjust the air baffle relative to the air temperature door with movement of the latter according to one of two side-by-side cam tracks. The cam tracks intersect at their two ends and are formed with individual temperature linearity patterns determined by the air conditioning and heating mode heat transfer requirements so as to provide substantial linearity between the temperature of the air delivered by the system and the air temperature door position in the respective modes. Included in the dual cam track arrangement is a one-way gate at each of the two track intersections. The one-way gates operate at the two extreme air temperature control door positions (full travel either direction) to switch the baffle operating cam onto the proper track, such full travel in either direction being a common control excursion by the operator in both modes and the one-way gates being directioned to utilize such events to direct and retain the cam on the proper track in the selected mode.

These and other objects, advantages and features of the present invention will become more apparent from the following description and drawing in which:

FIG. 1 is an exploded view of a portion of a vehicle air conditioning and heating system to which the preferred embodiment of the air temperature control arrangement according to the present invention has been adapted at the air temperature door.

FIG. 2 is an enlarged view taken along the line 2—2 in FIG. 1 with the air temperature door in its maximum cold position.

FIG. 3 is a view like FIG. 2 but with the air temperature door in its maximum hot position.

Figure 4:
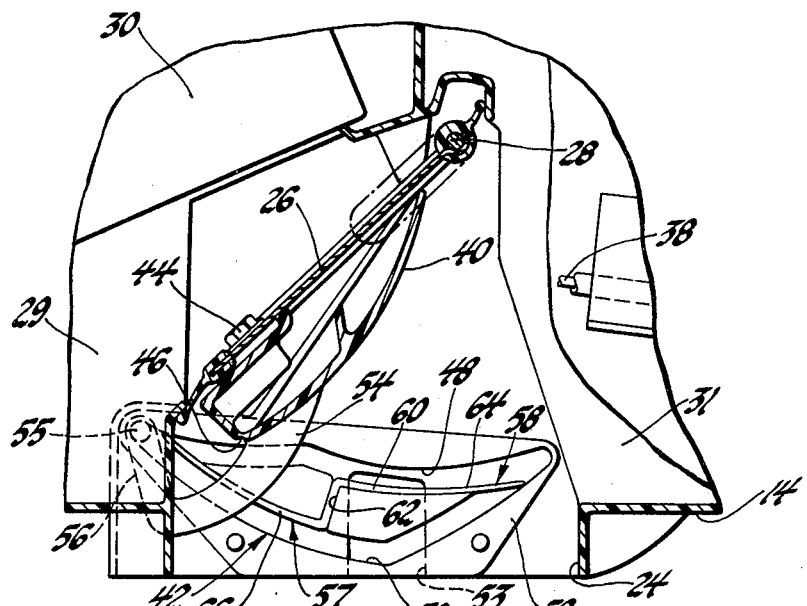
FIG. 4 is a view taken in the direction of the arrows 4—4 in FIG. 2 and with parts broken away.

Referring to FIG. 1, there is shown a vehicle air conditioning and heating system having a blower and evaporator case 10 which mounts on the engine side of an interior wall 12 of the vehicle and a heater and temperature control case 14 which mounts on the passenger side of the wall 12 opposite the case 10. A blower 16 mounted in the case 10 is operable to blow inlet air to the system through an evaporator 18 which is also mounted in case 10. Air from the evaporator 18 exits the case 10 through an outlet opening 20 and is delivered through an opening 22 in the wall 12 into an inlet opening 24 in the other case 14 (see FIGS. 2-4). An air temperature control valve in the form of a door 26 fixedly mounted on a pivot shaft 28 in the inlet opening 24 of the case 14 is operable to direct the air from the evaporator 18 via an internal duct 29 through a heater core 30 mounted in the case 14 and thence to an outlet opening 32 in the case 14 and/or directly via an internal bypass duct 31 to the outlet opening 32 in bypass relationship to the heater core 30 (see FIG. 4). The temperature controlled air from the case 14 is then directed by a distribution duct 34 to various heating, air conditioning and defroster outlets (not shown).

The hinge mounted air temperature door 26 is manually controlled by a temperature control lever 36 which is located in the passenger compartment and is connected by a sheathed wire 38 to a crank 39 that is fixed to the upper end of the air temperature door shaft 28 which extends through the top of case 14 for this purpose. A temperature legend labeled COLD and HOT at its extremes is arranged longitudinally of the travel of the temperature lever 36 and the operator moves the lever between these extremes in both an air conditioning (A/C) mode and heating mode to regulate the amount of air passing through the heater core 30 to thereby control the temperature of the air delivered by the system in these modes. It will also be understood that heating and/or air cooling with such temperature control may be utilized in other modes, e.g. heating in a defroster mode.

The A/C and heating system with just the manual air temperature door control thus far described is conventional. In such an arrangement, the amount of air required to pass through the heater core 30 at the same temperature door position in both the A/C mode and heating mode is normally quite different with the result that there is non-linearity between the temperature of the air delivered by the system to the passenger space and the air temperature door positions in the different modes. Thus, the operator is required to make substantially different incremental lever adjustments between the COLD and HOT extremes dependent upon the operating mode in order to obtain the desired temperature.

Figure 6:
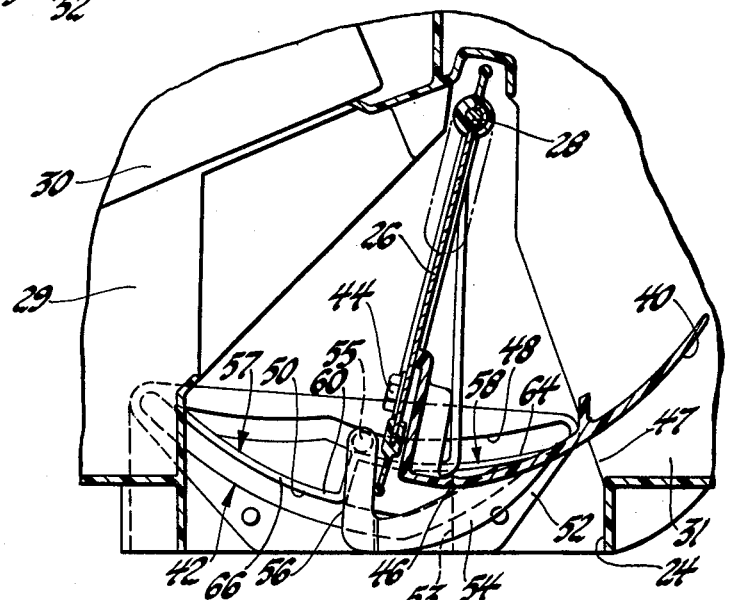
FIG. 6 is a view like FIGS. 4 and 5 but with the air temperature door in an intermediate position in the air conditioning mode.

The present invention provides a simple solution to the above non-linearity problem with an improved air temperature control arrangement that retains the single manually operated air temperature controller 36 yet provides substantially linear control in both the A/C mode and heating mode. This is accomplished with an air baffle 40 that is movable with and adjustable relative to the air temperature door 26 and a dual track operated cam arrangement generally designated as 42 that adjusts the air baffle relative to the air temperature door in a prescribed manner dependent upon the selected mode. The air baffle 40 has a generally dust pan shape and is secured by fasteners 44 to the free edge of the air temperature door 26 opposite its hinged edge at the pivot shaft 28 (see FIGS. 2-4). The air baffle 40 includes an integral living hinge 46 which permits the air baffle to hinge or pivot relative to the air temperature door along its free edge so as to vary the opening of the inlet opening 24 in case 14 to the bypass duct 31 and thereby adjust the amount of air permitted to pass through the heater core 30 in the various regulating air temperature door positions between its two extremes. For example, in the air temperature door's extreme cold position which is shown in FIGS. 2 and 4, all the air from the evaporator 18 is caused to bypass the heater core 30 and be routed directly to the outlet 32 and on to the system's distribution duct 34. On the other hand, when the air temperature door is in its full hot position shown in FIGS. 3 and 5 all the air from the evaporator 18 is caused to flow through the heater core 30 to the system's distribution duct 34. However, as the air temperature door 26 swings through the various intermediate or midtemperature positions between full cold and hot, the air baffle 40 is movable relative to the air temperature door so as to partially block the bypass duct 31 and establish a partial opening 47 as shown in FIG. 6 to thereby force more air to be directed through the heater core 30 than would normally be effected by just the air temperature door in this position.

The dual track operated cam arrangement 42 is effective to automatically adjust the air baffle 40 relative to the air temperature door 26 with movement of the latter according to one of two side-by-side cam tracks; namely, an A/C cam track 48 and a heating cam track 50. The two tracks 48 and 50 intersect at their two ends to form a closed loop or endless path and are formed by simple grooves in a cam track block 52. The cam tack block 52 is fixed to the bottom of case 14 beneath the path of movement of the air temperature door 26 and air baffle 40 and has a drain passage 53 to drain the bottom of the tracks of any liquid that might collect therein and freeze and thereby affect cam movement. The baffle 40 is operated by the cam tracks through a hook-shaped arm 54 which is formed integral with the lower edge of the air baffle and has an integral cylindrical cam follower 55 at its hooked end 56 that extends vertically downward and is captured for guided sliding movement in the endless path formed by the end joined cam tracks 48 and 50.

Figure 5:
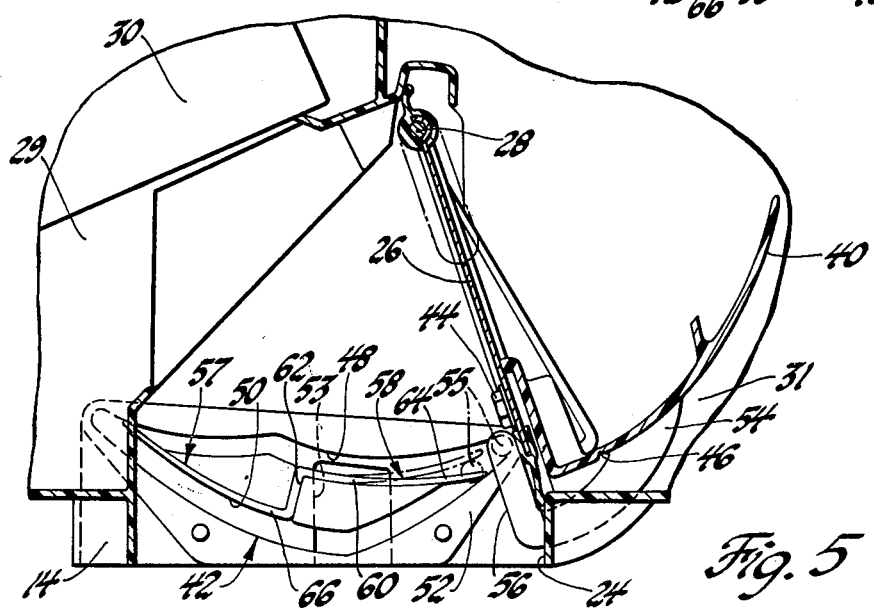
FIG. 5 is a view taken in the direction of the arrows 5—5 in FIG. 3 and with parts broken away.
Figure 7:
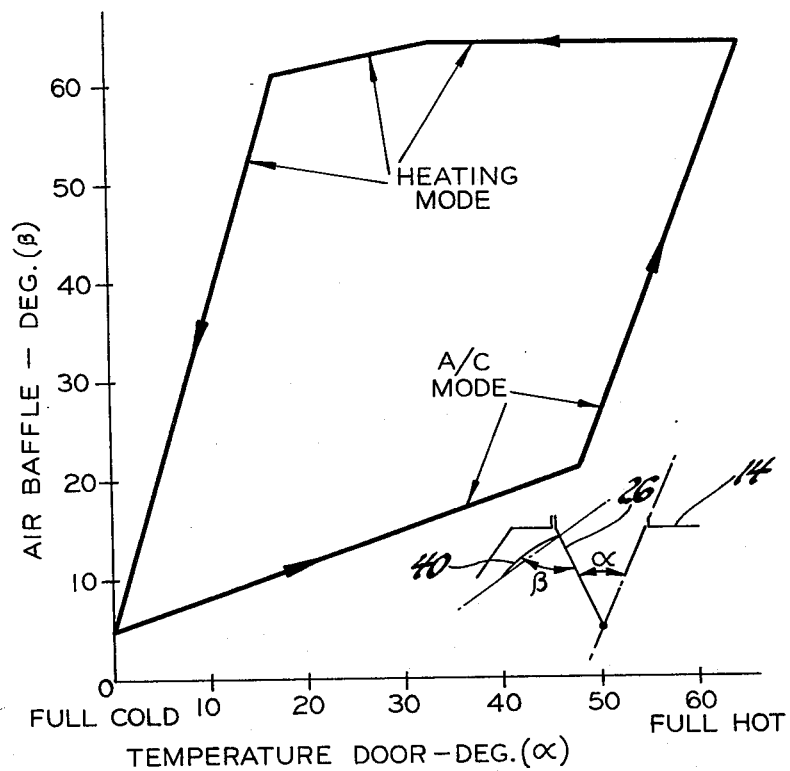
FIG. 7 is a graph showing baffle angle versus temperature door angle produced by the air temperature control arrangement as the air temperature door is moved through its various positions in the air conditioning mode and heating mode.
Figure 8:
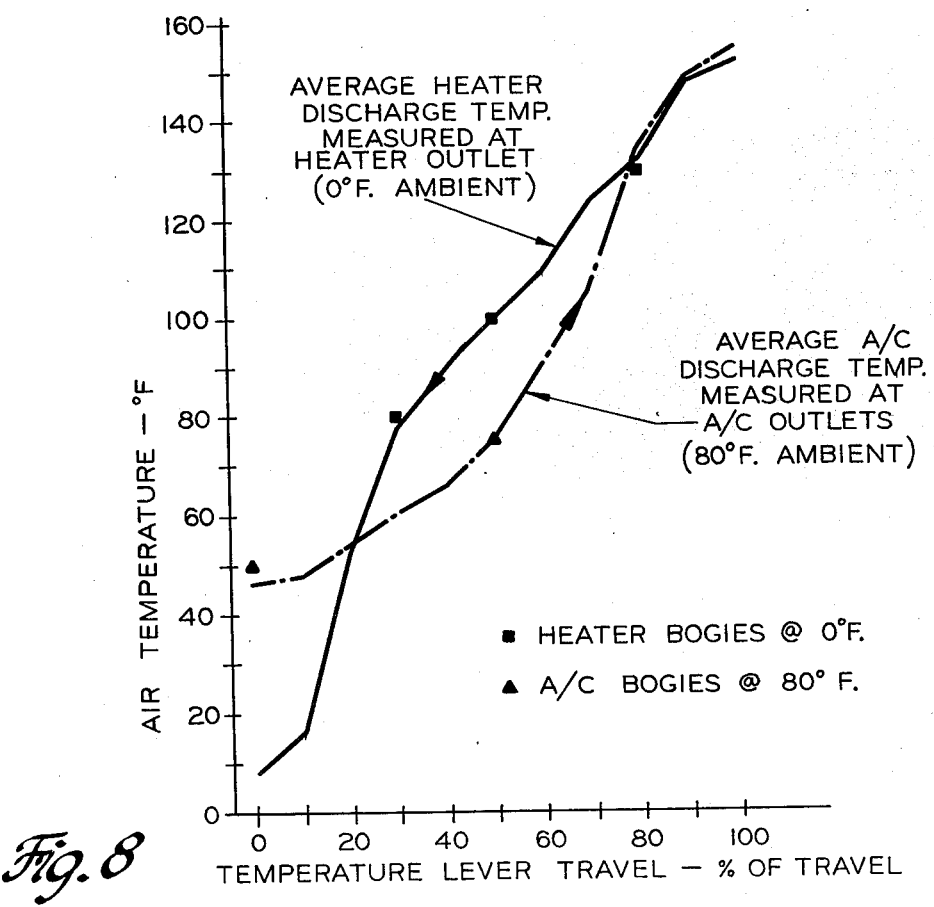
FIG. 8 is a graph showing actual results of the temperature control produced by the air temperature control arrangement in both the air conditioning mode and heating mode.

The cam tracks 48 and 50 are formed along their length with individual temperature linearity patterns determined by the respective A/C and heating mode heat transfer requirements of the particular system so as to provide substantially linearity between the temperature of the air delivered by the system and the air temperature door position in these different modes. For example, the curve of the A/C cam track 48 is determined knowing the heat transfer requirements in the A/C mode so that the air baffle 40 is controlled by the cam 55 following such track geometry to adjust the air distribution between the heater core 30 and the bypass duct 31 in the various intermediate air temperature door positions so as to produce substantial linearity between the temperature of the air delivered by the system in this mode and the air temperature door position which is manually controlled by the operator. For one particular vehicle application and by shaping the A/C cam track 48 as shown in FIGS. 4-6 to vary the angle $\beta$ of the air baffle 40 relative to the air temperature door 26 at the various angles $\alpha$ of the latter in the A/C mode as shown in FIG. 7, it was possible to produce a substantially linear relationship meeting the desired A/C bogies for this vehicle as shown in the air temperature versus temperature lever travel graph in FIG. 8. As can be seen in the actual cam track structure in FIGS. 4-6 and the angularity graphics in FIG. 7, this resulted in two distinct patterns of air baffle angle control in the A/C mode to produce the desired result. Similarly, the geometry of the heating mode cam track 50 is determined for the system in the heating mode and for the particular vehicle application there resulted the heating cam track configuration shown in FIGS. 4-6 to produce the air baffle angularity graph in FIG. 7 which made it possible to meet the heating bogies shown in the graph in FIG. 8. This also resulted in two distinct air baffle control patterns in the heating mode but it will be seen that they are quite different from those in the A/C mode as was found necessary to produce the linearity desired for the heating mode. Comparing the two control patterns shown in FIG. 7, it will be seen that in the A/C mode there is provided a small gradually increasing linear change in the relative angle $\beta$ of the air baffle with increasing temperature door angle $\beta$ through a major portion of air temperature door travel toward full hot and then a large increasing linear change through the relatively small remainder to full hot. This translates into small influence on air distribution by the air baffle in a wide low temperature range and a large influence in a narrow extreme high temperature range in the A/C mode. On the other hand, this overall pattern is reversed in the heating mode with substantially no change in the relative angle $\beta$ of the air baffle from the full hot angle $\alpha$ of the air temperature door until about midway and then a small but short length gradually decreasing linear change followed by a large decreasing linear change through the remainder to full cold. This translates into substantially no influence by the air baffle on air distribution except in a relatively narrow extreme low temperature range in the heating mode.

Included in the dual cam track arrangement is a one-way gate 57 and 58 at each of the two track intersections. The one-way gates 57 and 58 are simply formed by a double cantilever arm leaf spring element 60 which is mounted along its short intermediate length in a slot 62 in the track block and has its two arms 64 and 66 extending along the inner sides of the respective cam tracks at their deflectable ends so as to provide gate operation. The one-way gates 57 and 58 operate at the two extreme air temperature control door positions (full travel either direction) to switch the air baffle operating cam follower 55 onto the proper track, such full travel in either direction being a common control excursion by the operator in both modes as he or she adjusts the temperature therein and the one-way gates being directed to utilize such events to direct and retain the cam on the proper track in the selected mode. For example, when the system is in its heating mode with the heater core 30 functioning but not the evaporator core 18, the operator will at some time normally move the manual air temperature lever 36 to the extreme hot position which is that shown in FIG. 5. If the cam follower 55 is already on the heating mode cam track 50, it will be retained thereon and prevented from switching onto the air conditioning cam track 48 by arm 66 of the one-way gate 57. On the other hand, if the cam follower 55 is on the A/C cam track 48, the arm 66 will deflect to permit its switching with such air temperature door movement onto the heating mode cam track 50 whereafter it is then retained by this arm since opposite extreme temperature lever travel in the cold direction would not normally occur. On the other hand, when the system is in its A/C mode, the arm 64 of the other one-way gate 58 operates in a similar manner when the manually operated air temperature lever is moved to the extreme cold position but in this case the cam follower 55 will be either switched onto the air conditioning cam track 48 and retained thereon by arm 64 of the one-way gate 58 if it was initially on the heat cam track or it will be simply retained on the A/C track by this arm if it was initially thereon since opposite extreme temperature lever travel in the hot direction would not normally occur.

The above described preferred embodiment is illustrative of the invention which may be modified within the scope of the appended claims.

The embodiments of the invention in which an exclusive property or privilege is claimed are defined as follows:

1. In an air conditioning and heating system having a manually operated air temperature control valve that is movable in both an air conditioning mode and a heating mode to regulate the amount of air passing through a heat exchanger to thereby control the temperature of the air delivered by the system and wherein the amount of air required to pass through the heat exchanger at the same air temperature control valve position in both modes differs in order to establish linearity between the temperature of the air delivered by the system and the air temperature control valve position, an improved air temperature control valve arrangement comprising air baffle means movable with and adjustable relative to the air temperature control valve so as to adjust the amount of air passing through the heat exchanger in the various regulating air temperature control valve positions, and dual cam track operated air baffle control means for adjusting said air baffle means relative to said air temperature control valve with movement of the latter and selectively according to one of two predetermined and different cam tracks having linearity patterns determined by the respective air conditioning mode and heating mode heat transfer requirements so as to provide substantial linearity between the temperature of the air delivered by the system and the air temperature control valve position in both the air conditioning and heating modes.

2. In an air conditioning and heating system having a manually operated hinge mounted air temperature control door that is swingable in both an air conditioning mode and a heating mode to regulate the amount of air passing through a heat exchanger to thereby control the temperature of the air delivered by the system and wherein the amount of air required to pass through the heat exchanger at the same air temperature control door position in both modes differs in order to establish linearity between the temperature of the air delivered by the system and the air temperature control door position, an improved air temperature control valve arrangement comprising air baffle means hinge mounted on the air temperature control door so as to adjust the amount of air passing through the heat exchanger in the various regulating air temperature control door positions, and dual cam track operated air baffle control means for adjusting said air baffle means relative to said air temperature control door with movement of the latter and selectively according to one of two predetermined and different cam tracks having linearity patterns determined by the respective air conditioning mode and heating mode heat transfer requirements so as to provide linearity between the temperature of the air delivered by the system and the air temperature control door position in both the air conditioning and heating modes.

3. In an air conditioning and heating system having a manually operated air temperature control valve that is movable between a cold and hot position in both an air conditioning mode and a heating mode to regulate the amount of air passing through a heat exchanger to thereby control the temperature of the air delivered by the system and wherein the amount of air required to pass through the heat exchanger at the same air temperature control valve position in both modes differs in order to establish linearity between the temperature of the air delivered by the system and the air temperature control valve position, an improved air temperature control valve arrangement comprising air baffle means movable with and adjustable relative to the air temperature control valve so as to adjust the amount of air passing through the heat exchanger in the various regulating air temperature control valve positions, dual cam track operated air baffle control means for adjusting said air baffle means relative to said air temperature control valve with movement of the latter and selectively according to a cam follower following one of two predetermined and different cam tracks having linearity patterns determined by the respective air conditioning mode and heating mode heat transfer requirements so as to provide substantial linearity between the temperature of the air delivered by the system and the air temperature control valve position in both the air conditioning and heating modes, and one-way gate means at opposite ends of said cam tracks for switching said cam follower into the proper cam track on movement of the air temperature control valve to its cold and hot positions in the respective air conditioning mode and heating mode and thereafter retaining such cam operating condition on reoccurrence of such subsequent air temperature control valve movement in the respective modes.

* * * * *